INVENTOR.
Wolfgang Zerna
BY
Bair, Freeman & Molinare

Aug. 4, 1970   W. ZERNA   3,523,063
PRESTRESSED CONCRETE PRESSURE VESSEL FOR NUCLEAR REACTOR
Filed Aug. 11, 1967   3 Sheets-Sheet 2

INVENTOR.
Wolfgang Zerna
BY
Bair, Freeman & Molinare

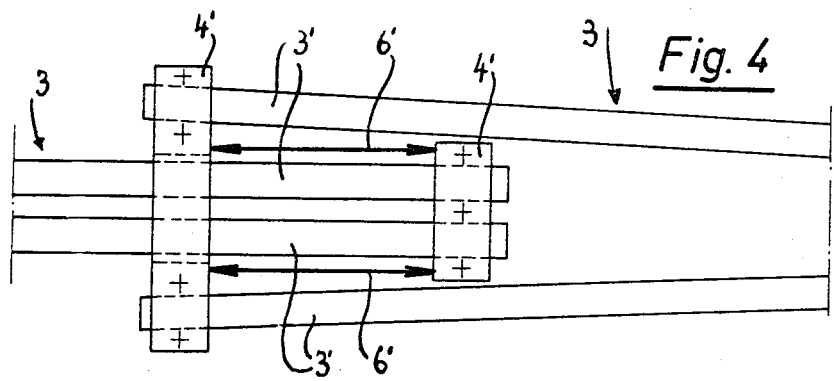
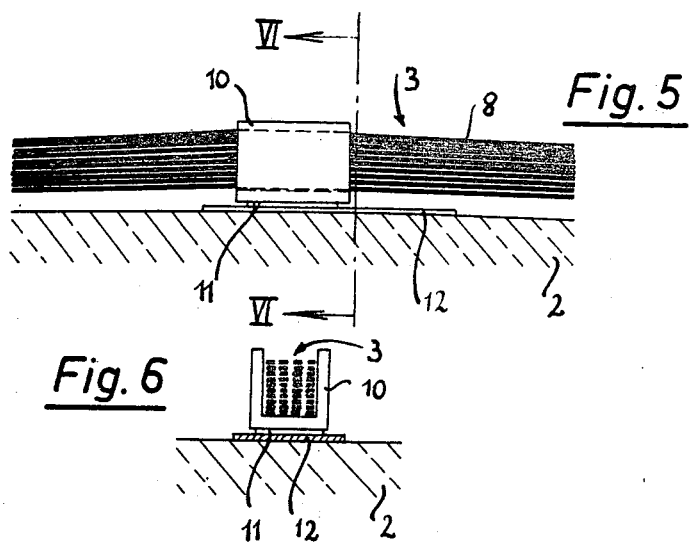
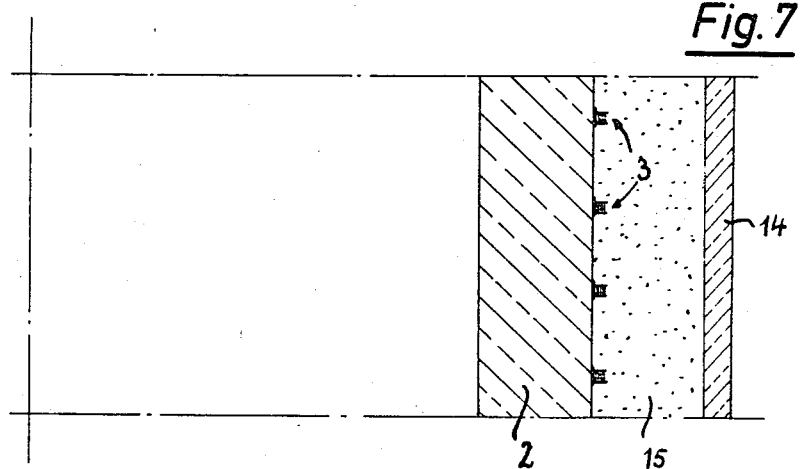

3,523,063
PRESTRESSED CONCRETE PRESSURE VESSEL
FOR NUCLEAR REACTOR
Wolfgang Zerna, Hannover, Germany, assignor to Philipp Holzmann AG, Frankfurt am Main, Germany, a company of Germany
Filed Aug. 11, 1967, Ser. No. 659,950
Claims priority, application Germany, Aug. 26, 1966, Z 12,398
Int. Cl. G21c 13/08
U.S. Cl. 176—87    10 Claims

ABSTRACT OF THE DISCLOSURE

The specification discloses apparatus and a method for prestressing concrete vessels to a value of compressive stress on the order of several thousand tons per meter of vessel height. Bundles of prestressing cables entirely encircle the vessel, whether cylindrical or spherical, but are not anchored thereto at intermediate points, and the cable ends are joined by a coupling device of material somewhat softer than the cables themselves. Temporary anchors near the ends of the cables are jacked together to apply the desired prestressing tension. Alternatively, the cable ends having the anchors thereon may overlap and the anchors are jacked apart before the clamping device is fastened thereto. In one embodiment, the cables are spaced from the surface of the vessel by bearing boxes spaced along the vessel periphery so that the cable path is polygonal. The bearing boxes slide on a steel sliding plate attached to the vessel wall and interposed therebetween is a sliding sheet of material such as "Teflon." The coupling device and anchors may also bear on such sliding sheets and plates. In a still further embodiment, an auxiliary concrete shell is spaced exteriorly and concentrically from the vessel wall and hot air blown therebetween to reduce the interior-exterior temperature differential and to provide corrosion protection for the prestressing cables.

SPECIFICATION

Field

This invention relates to a pressure vessel made of prestressed concrete for nuclear reactors and to a particularly advantageous method of prestressing such a vessel.

Background

In the course of development in the field of reactor construction, continually higher standards are expected of the pressure vessel with regard to compressive stress acceptance and temperature loading. Thus, the construction of the pressure vessel is becoming increasingly important.

For gas cooled, graphite moderated natural uranium reactors, it is already known to construct the pressure vessel as a prestressed concrete cylinder with prestressing elements arranged in the peripheral direction (so-called "ring elements"). It has been found that the prestressed concrete as a material is capable of fully meeting the existing requirements. At the same time, however, it has been found that the problem of prestressing the vessels in the ring direction has so far only been solved in a very unsatisfactory manner, with the result that different methods have been adopted substantially for each reactor pressure vessel hitherto constructed as regards prestressing in the search for an optimum solution. This is in general due to the fact that previously known prestressing methods are based on conventional prestressed concrete constructional work and are not adapted to the special requirements of pressure vessels for reactors.

Prestressed concrete pressure vessels for reactors which are to be subjected to high load must, in order to enable the forces which occur to be accepted with the necessary reliability, be prestressed with high prestressing forces of the order of magnitude of up to several thousand metric tons per meter of vessel height. The vessels must be prestressed in such a manner that as far as possible no disturbances in the stress state in the vessel wall result. It is preferred that it be possible to re-prestress or replace individual prestressing cables during the course of time. Also, of course, the outlay required for subjecting the pressure vessel wall to prestressing must in every case remain within economically tolerable limits. These requirements are not adequately met by the prestressing methods which have hitherto been usually made use of in the construction of prestressed pressure vessels, the most important of which will be outlined hereinafter, and this is all the more true in proportion as the loads acting on the pressure vessel are higher.

Among the prestressing methods most frequently used at present for the construction of pressure vessels for reactors, the so-called buttress method may be mentioned primarily. In this method, one or more prestressing elements are arranged about the vessel so as to encircle it. The ends of the individual prestressing elements are crossed over one another and prestressed and anchored to anchoring projections arranged on the pressure vessel, the buttresses. This does in fact permit prestressing cables with high prestressing forces to be arranged in a manner that has been found to be correct per se. But there are the disadvantages that the stress state of the vessel shell (the outer form of which in some cases has to be designed fully from the prestressing method point of view and not for what is best from the static point of view) is considerably disturbed by the buttresses. The overlapping of the prestressing elements in the region of the buttresses, which generally have a length of 1 m. to 1.2 m. along the vessel circumference, and the untensioned reinforcements necessary for introducing the prestressing forces requires a considerable amount of steel. Thus, this method is disadvantageous from the constructional point of view and also uneconomical.

Two other prestressing methods which have acquired some practical significance in the construction of pressure vessels are the so-called coil method and the so-called barrel hoop method. In the coil method, a prestressing element, the length of which amounts to a multiple of the vessel periphery is wound spirally under preload tension on the pressure vessel, whereas in the "barrel hoop method" a steel ring is driven onto the slightly conically shaped vessel, in the manner of a barrel hoop. It is a common feature of these two methods that they operate without anchoring and permit a fairly uniform stress distribution, but they are only suitable or economical with vessels having a small amount of prestressing. Thus, the winding method (which in any case does not meet with the requirements regarding subsequent adjustment of prestress or interchanging the prestressing elements) is economically advantageous up to prestressing forces of 100 to 200 metric tons per meter of the height of the vessel, whereas the prestressing forces possible with the barrel hoop method are even substantially smaller. Thus, these two methods cannot be considered for the construction of pressure vessels subjected to high load.

The method of constructing a pressure vessel segmentwise should also be mentioned, the pressure vessel being manufactured in segments and the prestress correspondingly being applied segmentwise. This does in fact have the advantage that the prestressing force losses due to friction which unavoidably occur in the prestressing elements along the vessel circumference are relatively slight. But apart from the fact that when closing the last segment section a compromise has to be accepted, a plurality of anchoring points are necessary which are uneconomical similar to the buttresses in the buttress method. Also, closing the last segment section causes considerable disturbances in the stress state of the vessel shell. Thus, the segment method is also not very suitable for the construction of pressure vessels subjected to high load.

In addition to the methods discussed hereinbefore, some other prestressing methods are also known, but these have not been generally accepted to any extent worth mentioning in pressure vessel construction practice and will only be mentioned here for the sake of completeness. In one of these methods, closed steel rings are laid about the vessel shell and are drawn away from the vessel shell with tensioning blocks placed underneath them and bearing against the shell, in order to subject the shell to preload. But relatively high prestressing forces are not possible. In another of these methods, prestressing elements which are prestressed before fitting are used, but this has not been generally accepted owing to the great amount of labor involved. Finally, in a third method, prestressing is applied by heating the prestressing steel. But high prestressing forces cannot be obtained, since the temperatures which can be allowed for the steel without risk of a loss in strength are much too low to use the permissible stresses of high-strength prestressing steel elements.

THE INVENTION

Objects

In contrast, it is among the objects of this invention to provide a reactor pressure vessel which meets all the existing requirements, i.e. which can be prestressed even with relatively high and very high prestressing forces (for example, forces amounting to more than 1,000 metric tons per meter of vessel height) in an economically tolerable manner and without disturbing the stress state, and which permits prestressing cables to be replaced or subsequently tension regulated.

Other objects will be evident from the following description.

SUMMARY

In order to achieve the objects, the invention is an improvement on the types of pressure vessel within the prestressing cables are guided about the vessel shell in the form of a closed ring. The invention is characterized in that prestressing cable lengths arranged like rings about the vessel bear directly on one another at their respective ends by a coupling device which connects them. Preferably, the coupling device is constructed to be releasable. The problems existing hitherto can be eliminated if fully encircling prestressing elements are used but these are not closed before fitting and are merely subjected to preload after fitting and are connected to form a closed ring only after fitting and after the prestressing forces have been applied. In this way it is possible in an extremely advantageous manner to produce very considerable prestressing forces without causing distrubances in the stress state at the prestressing zone in the vessel shell. The end result is, therefore, that the invention combines the advantages of the known pressure vessels which are prestressed with end anchoring (namely the concentrated prestressing cables which can apply high prestressing force) with the advantage of the known pressure vessels which are prestressed with closed rings (namely the omission of anchoring elements at the pressure vessel side), without involving the disadvantages of the hitherto known pressure vessels (particularly in regard to their uneconomical manufacture).

Detailed description

The invention will be explained in more detail hereinafter in examples of embodiments with reference to the drawings wherein:

FIG. 4 shows a diagrammatic explanation of a modified form of applying the prestressing forces to the cables used in FIG. 1;

FIG. 5 shows the detail V of FIG. 1;

FIG. 6 shows a section view on the plane VI—VI of FIG. 5; and

FIG. 7 shows a sectional view on the plane VII—VII of FIG. 1 supplemented with additional features.

Figure 1:
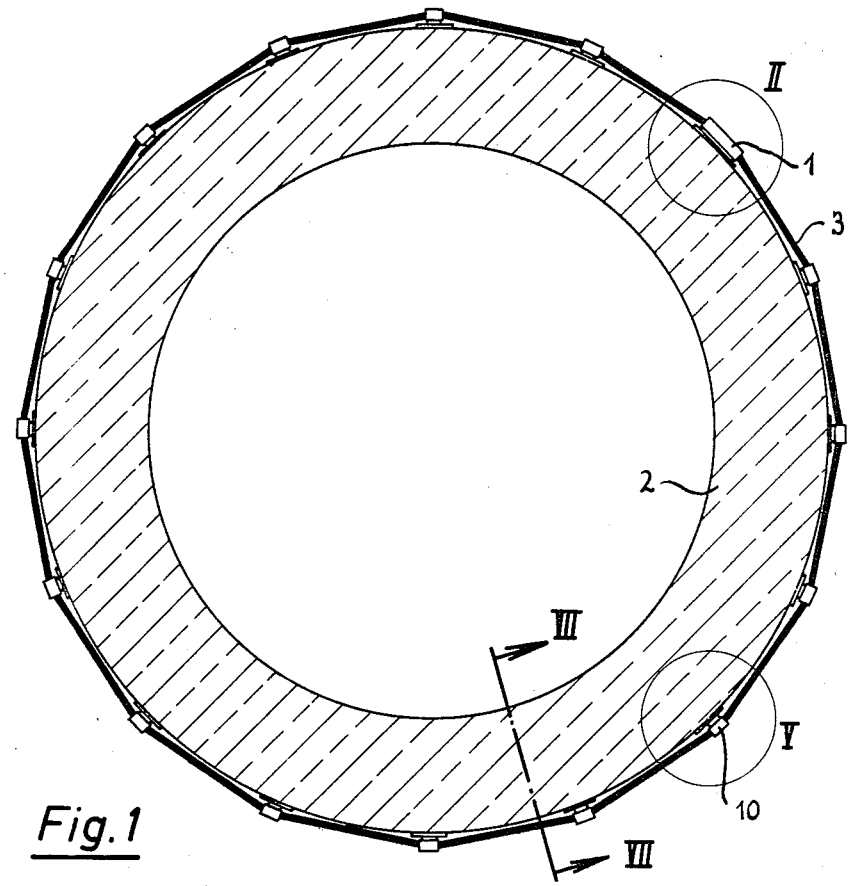
FIG. 1 is a cross-sectional view through a preferred form of embodiment of a pressure vessel according to the invention.

The simple production of even very great prestressing forces which becomes possible by the present invention makes it necessary to take into account particularly the friction conditions between the prestressing cables and the vessel wall, in order that no excessively high losses of prestressing force occur along the prestressing cable as a result of frictional losses. In this respect, the usual known measures for reducing friction between the prestressing cables and the vessel wall can be used (e.g. laying the prestressing cables in casing tubes filled with injected lubricants or the use of vibration during the prestressing operation), and if necessary it would also be possible to provide more than one prestressing zone (i.e. more than one coupling device) per prestressing element.

In a preferred constructional form of the invention, however, each prestressing cable ring is arranged in polygonal formation about the vessel wall, each guide box bearing, by means of an interposed, highly slidable sheet of material, e.g. "Teflon," poly(tetrafluoroethylene), CTFE, which is a poly(chlorotrifluoroethylene) plastic, or copolymers thereof with vinylidene fluoride, $VF_2$, such as "Kel-F," on a slide plate fixed to the vessel wall. This measure—if no contact occurs in the region between the guide boxes between the prestressing cables and the vessel wall—reduces the friction losses so much that a single prestressing zone is completely sufficient even with vessels having very long circumferences.

The prestressing cables can be post-tensioned if it is not desired to permit interchanging or regulating tension, in which case, the bonding concrete at the same time performs the function of corrosion protection.

Generally, and more particularly in the case of pressure vessels subjected to high temperature stress, it is not possible to dispense with the feature of interchanging or regulating the tension of the prestressing cable rings. In these cases it is preferable that the prestressing cable rings with the coupling devices are arranged in unbonded manner at the outer side of the vessel. A shell is arranged externally about the vessel and is spaced therefrom, hot air being made to flow through the space between the shell and the vessel. This guarantees corrosion protection for the prestressing cable rings and at the same time affords advantages as regards temperature insulation of the pressure vessel.

The pressure vessel according to the invention can be produced with a particularly simple prestressing method to which the invention also relates. This prestressing method is characterized in that the prestressing cable lengths are drawn together by means of a jack apparatus which acts on auxiliary anchors arranged in the vicinity of the prestressing cable ends, that the prestressing cable ends are then connected to one another by means of a coupling, and that the jack apparatus and the auxiliary anchors are then removed.

The example of embodiment of a pressure vessel shown in the drawings concerns a vessel which has the usual shape of an upright cylinder having a circular cross-section. But it is equally possible for the pressure vessel to be, e.g., in the form of a sphere, if this is desired in certain cases. The following remarks apply analogously to the spherical form.

As can be seen more clearly from FIG. 1, the wall 2 of the pressure vessel consists of concrete. It has a considerable thickness, which is usually of the order of several meters. Arranged externally about the vessel wall 2 are separate prestressing cables 3 (only one of which is visible in FIG. 1) which are each drawn together at their ends at a prestressing zone 1 and connected to form a closed ring. The prestressing cables 3 each run in a horizontal plane and are placed from one another in the vertical direction of the pressure vessel height at a suitable spacing determined by the particular data of the reactor in question. The prestressing zones 1 for the individual cables 3 may, but need not necessarily, be offset relatively to one another in succession in the vertical sense.

Figure 2:
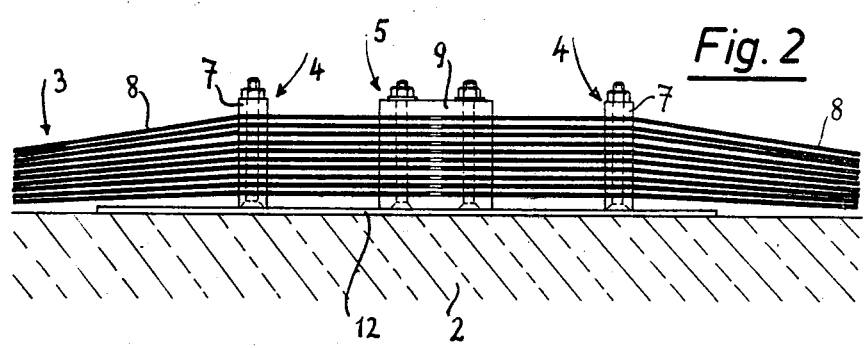
FIG. 2 shows the detail II of FIG. 1 on a larger scale.

As seen in FIG. 2, each of the prestressing cables 3 comprises a bundle of high-strength prestressing steel wires 8, e.g., ribbed sigma oval wires of the grade St 145/160, the number of prestressing steel wires combined to form a prestressing cable being dependent on the desired prestressing force in each case. The position of the prestressing steel wires relatively to one another can be arranged in a desired manner or in random fashion in the regions between the prestressing zones 1.

Figure 3A:
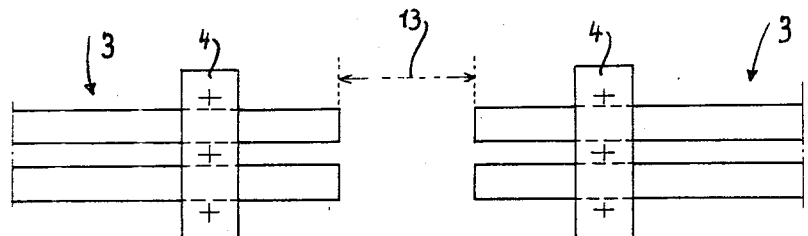
FIGS. 3a to 3d show a diagrammatic explanation of the application of the prestressing forces to the prestressing cables used in FIG. 1.
Figure 3B:
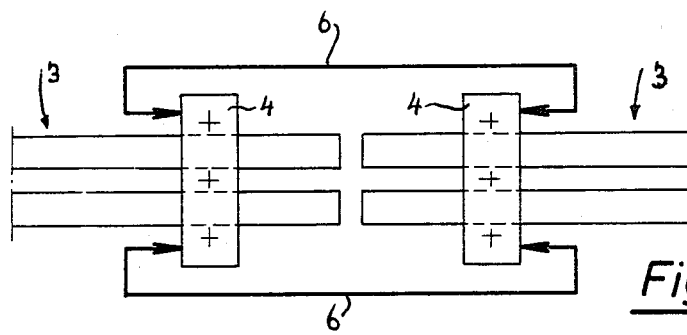
Figure 3C:
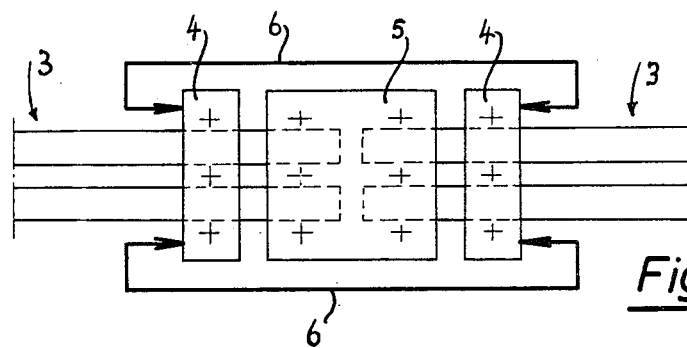
Figure 3D:
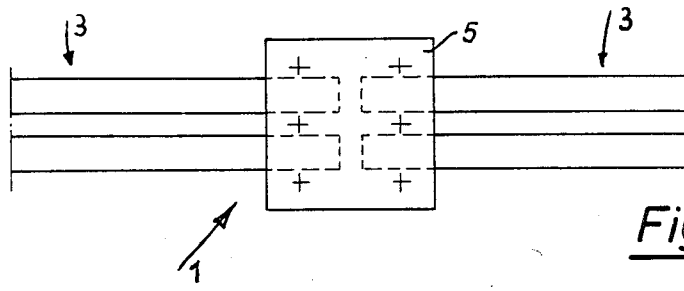

To apply the prestressing forces to the cables 3, it is convenient to use the procedure explained diagrammatically in FIGS. 3a to 3d. First, at each prestressing zone 1 two auxiliary anchors 4 are arranged in the vicinity of the two ends of the prestressing cables. The length of the cables 3 is made somewhat shorter in the untensioned state than the circumferential length of the vessel wall 2, so that between the ends of the cables a spacing 13 remains (FIG. 3a) the size of which corresponds to the extension travel necessary for applying the desired prestressing force to the cables. By means of a jack of a suitable construction, which is indicated schematically by the arrows 6 and which acts on the auxiliary anchors 4 symmetrically with respect to the axis of the cables, it is possible to draw the ends of the cables 3 close together. Thus, the cables 3 are subjected to the appropriate preload (FIG. 3b).

The auxiliary anchors 4 are spaced from the ends of the prestressing cables 3 sufficiently to allow a coupling device 5 to be arranged between the auxiliary anchors (FIG. 3c), as long as the ends of the cables are held in the drawn-together state by the jack apparatus 6 acting on the auxiliary anchors 4. This coupling device 5 connects the cables 3 to form a closed ring which is subjected to the necessary preload. After the arrangement of the coupling device 5, the jack apparatus 6 and the auxiliary anchors 4 can be removed, so that the prestressing zone 1 (FIG. 3d) is now in its final form. The auxiliary anchors can be used again for the tensioning of other cables.

As FIG. 2 shows in more detail, the auxiliary anchors 4 in actual practice conveniently consist of a set of clamping plates 7 which can be bolted to one another and correspondingly the coupling device 5 is conveniently constructed as a set of clamping plates 9 which can be bolted to one another. These clamping plates can be steel plates, but preferably the plate material chosen should be somewhat softer than the material of the prestressing steel wires 8. As a result, the ribs of the prestressing steel wires can press into the clamping plates when the latter are bolted together, so that a secure grip is obtained between the clamping plate and the steel wires. The individual steel wires are arranged in an ordered position between the clamping plates so that a reliable connection of the wires to the clamping plates is guaranteed in every case. The butt ends of the wires are substantially aligned.

FIG. 4 illustrates an alternative method of applying the prestressing force to the prestressing cables 3. There, the prestressing cables 3 are provided with end regions 3' slightly overlapping one another and are connected substantially directly at their ends with auxiliary anchors 4'. Naturally, these auxiliary anchors must not at the same time have a connection to the opposite ends of the prestressing cables 3. This can be insured easily by passing one end of the involved prestressing cables 3 by the auxiliary anchors arranged at the other end, or passing them, with suitable clearance, through the said anchors. A hole in the left anchor is indicated by dashed lines in FIG. 4. In this embodiment, the overlapping end regions 3' of the prestressing cables 3 are made sufficiently long to permit a jack apparatus (indicated schematically by the arrows 6') to be applied between the auxiliary anchors 4'. The overlap is also sufficient to permit a coupling device corresponding to the coupling device 5 to be positioned so as to couple all the cables after the auxiliary anchors 4' have been pressed away from one another by the jack apparatus 6' over the requisite extension travel.

The method according to FIG. 4 is more advantageous than the method shown in FIG. 3, since the jack apparatus 6' can be a pressure-applying jack apparatus of a simple constructional form that has a considerable power even with small dimension. In contrast, with the method shown in FIG. 3, the jack apparatus usually has to be a hollow-piston press or a double-cylinder press and is therefore more expensive. On the other hand, the amount of prestressing steel wire used with the method shown in FIG. 4 is somewhat greater owing to the overlapping end regions 3'. The excess wire requirement in some cases balances out the advantage of using a somewhat simpler jack apparatus.

However, both methods shown in FIGS. 3 and 4 have in common the advantage that they can be used with great and very great prestressing forces. They also provide a prestressing cable which is tensioned in the form of a closed ring without requiring any anchoring of the prestressing forces in the concrete during the prestressing operation or for the final condition at the prestressing zone. This eliminates any risk of disturbing the stress state in the vessel wall by local introduction of force. Also, both methods have the advantage that the prestressing cables can be interchanged or retensioned, since it is possible at any time to apply the auxiliary anchors and the jack apparatus again, to release the coupling device, retension the cables (or relieve them of load and replace by a new cable) and then reapply the coupling device.

The number of prestressing zones 1 per cable depends on the different conditions in each case. It is, of course, desirable to manage with a single prestressing zone per cable, if possible. This object can also be readily achieved if it is insured, or means are taken to insure, that the prestressing cable ring applied about the vessel wall has as low friction as possible relative to the vessel wall. The higher this friction is, the greater are the prestressing force losses which occur from the prestressing zone along the prestressing cable ring.

There are already various known measures for reducing friction between prestressing cables and the vessel wall. For example, it is possible to lay the prestressing cables in casing tubes filled with a lubricant (e.g. oil) or to subject the prestressing cables during tensioning to a vibration generator which introduces vibrations into the prestressing cables and thus converts the static friction normally present into the substantially weaker sliding friction. These known measures can be used readily within the framework of the invention, but they do not guarantee in every case that only a single prestressing zone may be used per cable. On the contrary, and more particularly when the vessel concerned has a relatively considerable circumferential length, it is usually necessary to provide more than one prestressing zone in order not to have too high losses of prestressing force along the cables.

In contrast, however, it has been found particularly advantageous within the framework of the invention to use a measure for reducing friction which is explained in FIG. 1 in conjunction with FIGS. 5 and 6, and which, even when the peripheral length of the vessel concerned is very considerable, enables a single prestressing zone per prestressing cable to be sufficient.

According to this feature, the prestressing cables 3 are not arranged about the vessel wall 2 so as to be applied flat, but are guided at more or less regular intervals through U-shaped guide boxes 10 (they can be in a completely random formation, without any order, within these guide boxes). These guide boxes 10 themselves are provided at their underside with a sliding sheet 11 made of "Teflon" (poly-tetrafluoroethylene) and rest on a sliding plate 12, which is connected to the vessel wall and is made of special steel or the like. They are also so dimensioned as regards their spacing from the vessel wall 2 that the prestressing cables 3 follow a polygonal course about the vessel wall and do not contact the vessel wall 2 in the region between the corners of the polygon (i.e., the region between the guide boxes 10).

As a result, all the friction between the prestressing cables 3 and the vessel wall 2 is reduced to the friction occurring between the "Teflon" sheets 11 and the special steel plates 12. This friction is extremely slight and causes very low losses of prestressing force, even if no vibration is used during tensioning. For example, in a practical case of a vessel having a diameter of 24 m., and using a prestressing force of 560 metric tons per cable, it has been found that with 22 guide boxes 10 arranged at intervals of about 1.70 m. from one another, a prestressing force loss of less than 9% occurs at the region of the prestressing cables 3 diametrally opposite the prestressing zone.

Such a small loss in prestressing force makes it quite possible to dispense with providing more than one prestressing zone per cable, and also affords the advantage that there is a uniform external pressure over the entire vessel periphery as a result of the substantially uniform deflection forces from the prestressing. It is true that the prestressing is introduced locally, namely only at the places where the prestressing cables 3 are deflected or change their course (these being in the region of the guide boxes 10), into the vessel wall, but this is not in any way troublesome owing to the considerable thickness of the vessel wall.

The use of sliding plates 12, possibly in conjunction with the "Teflon" sliding foil or sheet 11, is not limited to the region of the guide boxes 10 (i.e. the deflection zones), but can equally well be provided at the prestressing zones 1. This is particularly important for the auxiliary anchors 4 which have to carry out a sliding movement relative to the vessel wall 2 during the prestressing operation. FIG. 2 shows one such arrangement of a sliding plate 12 in the region of a prestressing zone 1. Optionally, a sliding sheet of "Teflon" (not shown) may be interposed between plate 12 and anchors 4.

The particular advantages of the invention become particularly clear if it is also considered that in reactor pressure vessels used in construction is usually subjected to high temperatures. The behavior of concrete at high temperatures is still not very fully known, particularly with regard to the creep and shrinkage which occurs to an increased extent. Therefore, in principle, the possibility cannot be excluded that unforseen prestressing force losses due to temperature influences occur in pressure vessels. Such unpredictable losses, however, can be compensated for at any time by re-tensioning or interchanging the prestressing cables.

In practice, considerable temperatures occur in a reactor pressure vessel. These temperatures cannot act directly on the vessel wall 2, since the maximum temperatures permissible for concrete are quite low, and also since the permissible temperature difference between the inner side and the outer side of the vessel wall is very small owing to the relatively small range of permissible concrete stresses. As a result, the vessel wall must be provided at the inner side with a very good internal thermal insulation. In a further embodiment of this invention, it is possible to reduce the outlay for such thermal insulation in a simple manner, starting from the fact that in any case measures have to be taken to protect from corrosion the prestressing cables 3 arranged about the vessel wall. Corrosion protection of this kind cannot be effected by concreting on a thin protective layer, or by the application of gun-applied concrete, owing to the need for re-tensioning or replacing the prestressing cables. The protection must be such that it remains possible to re-tension or replace the prestressing elements.

FIG. 7 shows that at a spacing about the pressure vessel there is arranged a thin shell 14 of reinforced concrete, the space 15 between the vessel wall and this shell being heated with dry hot air. The shell has only the function of providing an air-tight closure. Its spacing from the vessel wall is made expediently such that it is possible to walk through the space 15 in order to inspect the prestressing cables 3 and the outer surface of the vessel.

Providing a hot air flow over the outer side of the vessel achieves two objects: (1) on the one hand, corrosion protection is guaranteed for the prestressing cables 3 arranged externally on the vessel wall, and (2) the heating of the outer side of the vessel either (a) moderates the temperature stresses in the concrete with the same amount of internal insulation, or (b) reduces the amount of internal insulation necessary with the same temperature differential. This results in important additional advantages. It is true that as long as no concrete is developed with which high temperatures are permissible, it is not possible to dispense completely with internal insulation for the pressure vessel. But even the use of a concrete temperature of 100 to 150° C., such as is possible with present day qualities of concrete, affords a considerable saving in cost. With increasing permissible concrete temperatures, the economic importance of the embodiment disclosed in connection with FIG. 7 increases further, especially since at the same time it also represents a substitute for the corrosion protection measures which otherwise become necessary.

Finally, it should be mentioned that, if re-tensioning or replacement of prestressing elements is not required, it is also possible to provide a subsequent bonding of the prestressing elements to the vessel wall, for example by applying a corrosion-protection layer of concrete externally to the vessel wall after the tensioning of the prestressing elements.

Although the cables 3 are clamped between the clamping plates 7 of the auxiliary anchors 4 and of the coupling device 5 side-by-side in parallel relationship in their correct order, in the guide boxes they need not necessarily be arranged in their original order or in parallel relationship but may lie across one another. The reference to the requirement that the cables bear directly on one another means to convey that each end of the prestressed cable lengths is not anchored in an anchor that forms part of the concrete structure, but is anchored directly to its other end or the adjacent end of the next following cable length. Thus, the cable ring formed is independent of the concrete structure, but the ring is not formed before stressing of the cables; the cables are first prestressed and then the closed ring is formed.

Having described my invention, I claim:
1. In a nuclear reactor pressure vessel made of prestressed concrete wherein exterior prestressing cable lengths are disposed in the form of a closed prestressing cable ring in tension about the vessel shell, the improvement comprising arranging said prestressing cable lengths to bear directly on one another at their respective ends by a compression coupling device which connects said lengths, and said prestressing cable ring is arranged polygonally about the vessel wall by a plurality of guide boxes spaced along said cable ring from one another, each of said guide boxes bears by means of an interposed sliding sheet of material consisting of poly(tetrafluoroethylene), a poly(chlorotrifluoroethylene), or copolymers of a poly-(chlorotrifluoroethylene) with vinylidene fluoride on a sliding plate of steel fixed to the vessel wall.

2. A nuclear reactor pressure vessel of claim 1, wherein each of said coupling devices is releasable.

3. A nuclear reactor pressure vessel of claim 1 wherein each of said coupling devices consists of clamping plates which are bolted to one another and which grip in a clamping fashion the ends of the prestressing cable lengths, the material of said clamping plates being somewhat softer than the material of the prestressing cables.

4. A nuclear reactor pressure vessel of claim 1, wherein a plurality of coupling devices are provided for each prestressing cable ring.

5. A nuclear reactor pressure vessel of claim 4 wherein said coupling devices at the individual prestressing cable rings are longitudinally offset relative to one another.

6. A nuclear reactor pressure vessel of claim 1, wherein a sliding plate fixed to the vessel wall is disposed in the region of each of said coupling devices, on which each of said coupling devices bear.

7. A nuclear reactor pressure vessel of claim 6 wherein a sliding sheet is interposed between each of said sliding plates and said coupling devices.

8. A nuclear reactor pressure vessel of claim 1 wherein the prestressing cable rings are disposed out of contact with the outer wall of the vessel.

9. A nuclear reactor pressure vessel of claim 8 wherein a shell is disposed externally concentrically about said vessel and spaced therefrom, whereby the intervening space defined between said shell and said vessel is adapted to receive hot air for flow therethrough.

10. A nuclear reactor pressure vessel of claim 1 wherein in a single coupling device is provided for each prestressing cable ring.

References Cited

UNITED STATES PATENTS

| | | | |
|---|---|---|---|
| 2,185,749 | 1/1940 | Kennedy | 52—224 |
| 2,315,895 | 4/1943 | Crom | 52—224 |
| 3,146,549 | 9/1964 | James | 52—224 |
| 3,249,374 | 5/1966 | Muehle et al. | 52—230 |
| 3,313,560 | 4/1967 | Macchi | 52—230 |
| 3,349,524 | 10/1967 | Fistedis | 52—224 |
| 3,397,503 | 8/1968 | Adler | 52—224 |

FOREIGN PATENTS

| | | |
|---|---|---|
| 975,105 | 11/1964 | Great Britain. |
| 989,663 | 4/1965 | Great Britain. |

REUBEN EPSTEIN, Primary Examiner

U.S. Cl. X.R.

52—224; 165—169